United States Patent
Rago (10) Patent No.: US 7,167,867 B1
(45) Date of Patent: Jan. 23, 2007

(54) SELF-DESCRIBING FILE SYSTEM

(75) Inventor: Stephen A. Rago, Berkely Heights, NJ (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/679,456

(22) Filed: Oct. 4, 2000

Related U.S. Application Data (60) Provisional application No. 60/157,777, filed on Oct. 5, 1999.

(51) Int. Cl.
*G06F 17/30* (2006.01)
(52) U.S. Cl. .................. 707/101; 707/10; 707/205
(58) Field of Classification Search .............. 707/1, 707/10, 204
See application file for complete search history.

(56) References Cited

U.S. PATENT DOCUMENTS

| | | | |
|---|---|---|---|
| 5,257,369 A | | 10/1993 | Skeen et al. |
| 5,363,487 A | * | 11/1994 | Willman et al. ............... 710/8 |
| 5,463,754 A | * | 10/1995 | Beausoleil et al. ......... 709/213 |
| 5,640,559 A | | 6/1997 | Silberbauer et al. |
| 5,752,005 A | * | 5/1998 | Jones ........................... 703/22 |
| 5,761,739 A | * | 6/1998 | Elko et al. .................. 711/171 |
| 5,768,532 A | * | 6/1998 | Megerian .................... 709/245 |
| 5,832,501 A | * | 11/1998 | Kain et al. ....................... 707/1 |
| 5,832,515 A | * | 11/1998 | Ledain et al. ............... 707/202 |
| 5,857,195 A | | 1/1999 | Hayashi et al. |
| 5,905,987 A | | 5/1999 | Shutt et al. |
| 5,950,203 A | * | 9/1999 | Stakuis et al. ................ 707/10 |
| 5,996,054 A | * | 11/1999 | Ledain et al. ............... 711/203 |
| 6,021,408 A | * | 2/2000 | Ledain et al. ................... 707/8 |
| 6,119,118 A | * | 9/2000 | Kain et al. ....................... 707/1 |
| 6,321,258 B1 | * | 11/2001 | Stollfus et al. ............. 709/220 |
| 6,324,581 B1 | * | 11/2001 | Xu et al. ..................... 709/229 |
| 6,389,420 B1 | * | 5/2002 | Vahalia et al. ................. 707/8 |
| 6,453,354 B1 | * | 9/2002 | Jiang et al. ................. 709/229 |
| 6,466,978 B1 | * | 10/2002 | Mukherjee et al. ......... 709/225 |
| 6,493,804 B1 | * | 12/2002 | Soltis et al. ................. 711/152 |
| 6,556,998 B1 | * | 4/2003 | Mukherjee et al. ........... 707/10 |
| RE38,410 E | * | 1/2004 | Hersch et al. .............. 709/203 |
| 6,691,177 B1 | * | 2/2004 | Utsunomiya et al. .......... 710/6 |

(Continued)

OTHER PUBLICATIONS

Source to ufs/ufs/ufs_bmap.c © 1993 The Regents of the University of California, © Unix System Laboratories. http://freebsd.active-venture.com/FreeBSD-srctree/newsrc/ufs/ufs/ufs_bmap.c.html#ufs_bmap.*

(Continued)

*Primary Examiner*—Jean M. Corrielus
(74) *Attorney, Agent, or Firm*—Fish & Richardson P.C.

(57) ABSTRACT

The invention provides a way for computer applications to parse the operating system's file system format without embedding direct knowledge of the format in the applications themselves. By making a file system self-describing, applications running locally on the same computer, or remotely on another computer, can interpret file system data structures if they can access the disk containing the file system. Storage Area Networks (SANs) present a paradigm where multiple computer systems can see the same set of disk resources. This, combined with the invention of self-describing file systems, makes it possible to build applications that are more intelligent and perform better than their counterparts that either embed knowledge of a file system or rely on a file system driver to interpret the structure on behalf of the applications.

27 Claims, 8 Drawing Sheets

U.S. PATENT DOCUMENTS

| | | | |
|---|---|---|---|
| 6,725,281 B1 * | 4/2004 | Zintel et al. | 719/318 |
| 6,795,895 B1 * | 9/2004 | Merkey et al. | 711/114 |
| 6,862,609 B1 * | 3/2005 | Merkey | 709/214 |
| 6,892,230 B1 * | 5/2005 | Gu et al. | 709/220 |
| 6,910,068 B1 * | 6/2005 | Zintel et al. | 709/220 |

OTHER PUBLICATIONS

M. Borland, "A Self-describing file protocol for smulation integration and shared postprocessors".*

Borlnd et al., "The self describing data sets file protocol and tollkit".*

Charles S. Zender, "netCDF operators (NCO) for analysis of self-describing gridded geoscience data".*

Spear et al., "Solving the starting problem: device drivers as self-describing artifacts".*

Andras et al., "An XML based framework for self-describing parallel I/O data", IEEE, 2003.*

HDF5, User's guide: Data model, file structure, Chapter 1.*

Bach, Maurice J. The Design of the Unix Operating System. Prentice-Hall, Englewood Cliffs, NJ. 1986.

CrosStor Software, Inc., CIFS Extensions for SANs, White Paper, May 10, 1999.

CrosStor Software, Inc., Adapting NAS Protocols to SANs, White Paper, May 10, 1999.

Entropic Research Laboratory, Inc., ESPS/waves+with EnSig™ Application Notes, Chapter entitled "Non-ESPS Programs and the ESPS File System," Release 5.3, 1998. http://www.ling.ed.ac.uk/help/entropic/.

NCSA, HDF5 Reference Manual, Release 1.2, Oct. 1999.

CrosStor Software, Inc. Adapting NAS Protocols to SANs. White Paper, May 10, 1999.

Entropic Research Laboratory, Inc. ESPS/waves+with EnSig™ Application Notes. Chapter entitled "Non-ESPS Programs and the ESPS File System." Release 5.3, 1998. http://www.ling.ed.ac.uk/help/entropic/.

NCSA. HDF5 Reference Manual. Release 1.2, Oct. 1999.

* cited by examiner

| Feature | Network File System | SNIA Proposal | Self-Describing File System | Clustered File System |
|---|---|---|---|---|
| Serialization | server | server | server | clients |
| Disk Block Mapping | server | server | clients | clients |
| Block Allocation | server | server | server | clients |
| Disk Access | server | clients | clients | clients |

Figure 6.

```
<FS Parameters>
      <CONST NAME="BSIZE"> 1024 </CONST>
      <CONST NAME="INOSZ"> 64 </CONST>
      <CONST NAME="INOPB">  BSIZE / INOSZ </CONST>
      <CONST NAME="ISIZE"> {derived from super block} </CONST>
      <CONST NAME="STARTI"> 2 </CONST>
      <CONST NAME="PSTART"> {physical start of file system} </CONST>
      <CONST NAME="NADDR"> 13 </CONST>
      <CONST NAME="NDADDR"> 10 </CONST>
      <CONST NAME="NIADDR"> 3 </CONST>
      <CONST NAME="IADDRSZ"> 3 </CONST>
      <CONST NAME="IADDROFF"> 12 </CONST>
      <CONST NAME="ISIZEOFF"> 8 </CONST>
      <CONST NAME="BYTEORDER"> 0 </CONST>
      <CONST NAME="NSHIFT"> 8 </CONST>
      <CONST NAME="NINDIR"> BSIZE / 4 </CONST>
      <CONST NAME="NBPSCTR"> 512 </CONST>
</FS Parameters>

<MACRO NAME="LTOPBLK" PARAMS="BN"> BN * (BSIZE / NBPSCTR) </MACRO>

<FUNC NAME="iread">
      <BODY>
            int32
            iread(int16 ino, char *buf)
            {
                  int32 bn;
                  int32 boff;

bn = (ino + (2 * INOPB - 1)) / INOPB;
                  boff = (ino + (2 * INOPB - 1)) & (INOPB - 1);
                  PREAD(LTOPBLK(bn), buf, BSIZE);
                  return boff;
            }
      </BODY>
</FUNC>

<FUNC NAME="bmap">
      <BODY>
            int32
            bmap(char *ibuf, int32 off, int32 len, int32 *dbuf)
            {
                  int32 sh;
                  int32 i;
                  int32 j;
                  int32 bn;
                  int32 blim;
                  int32 nblk;
                  int32 *bnp;
                  int32 daddr[NADDR];
                  char ib[BSIZE];
                  char *cp;
                  int32 naddr = 0;

nblk = len + (BSIZE - 1) / BSIZE;
                  if (nblk == 0)
                        return 0;
```

Figure 7.

```
/*
 * build an address array, converting from 3-byte
 * addresses to 4-byte addresses.
 */
cp = ibuf + IADDROFF;
for (i = 0, j = 0; i < IADDRSZ; i += IADDRSZ, j++) {
    if (BYTEORDER == 0)
            daddr[j] = cp[i]<<16|cp[i+1]<<8|cp[i+2];
    else
            daddr[j] = cp[i+2]<<16|cp[i+1]<<8|cp[i];
}

/*
 * Fill the dbuf array with the list of block numbers.
 */
while (len > 0) {
    bn = off / BSIZE;
    len -= BSIZE;
    off += BSIZE;
    if (bn < NADDR - NIADDR) {
            dbuf[naddr++] = daddr[bn];
            continue;
    }
    bn -= NDADDR;
    sh = 0;
    blim = 1;
    for (j = NIADDR; j > 0; j--) {
            sh += NSHIFT;
            blim <<= NSHIFT;
            if (bn < blim)
                    break;
    }
    if (j == 0)
            return naddr;
    ibn = daddr[NADDR-j];
    if (inb == 0) {
            dbuf[naddr++] = 0;
            continue;
    }
    for (; j <= 3; j++) {
            sh -= NSHIFT;
            PREAD(LTOPBLK(ibn), ib, BSIZE);
            bnp = (int32 *)ib;
            i = (bn >> sh) & (NINDIR - 1);
            if (bnp[i] == 0)
                    break;
            ibn = bnp[i];
    }
    dbuf[naddr++] = bnp[i];
}
return naddr;
}
</BODY>
</FUNC>
```

Figure 8.

SELF-DESCRIBING FILE SYSTEM

CROSS REFERENCE TO RELATED APPLICATIONS

This application is related to, and claims the priority of, U.S. Provisional patent application Ser. No. 60/157,777 filed Oct. 5, 1999 and entitled "Self-Describing File System" by the same inventor Stephen A. Rago.

BACKGROUND OF THE INVENTION

1. Field of the Invention

The invention relates to the shared access of a computer system's file system storage by disparate, possibly unrelated, applications, such as portable file system administrative tools or sharing file systems in a storage area network (SAN).

2. Description of Related Art

A "file system" is an abstraction a computer operating system uses to ease the management of its user's data. Data are separated into storage units called "files" based on subject matter. Related files can be grouped together (usually also by subject matter) by listing their names in the same "directory."

Applications that need to read or write files do so through a "file system driver." The driver translates an application's request into the operations needed to read or write the storage locations that contain the data. The storage medium is usually some sort of magnetic or optical disk, but need not be limited to disks. For example, a file system driver can use RAM as the backing store for temporary file storage.

Applications usually don't know how their data are stored on disk, and don't want to know, for that matter. It is much better to isolate the knowledge of the file system format in some external place (the driver, in this case) than to embed it in each application. This makes the applications smaller, easier to write, and more portable. The benefits of portability are not to be underestimated. Many different file system formats exist, and it would be next to impossible to embed knowledge about each one in an application.

In addition to portability, centralizing the control in the file system provides a convenient way to serialize access to the on-disk data structures. If each application were to attempt to manage the file system data structures on disk, they would need to agree amongst themselves so that only one application modifies the same on-disk structure at a time. The file system driver relieves applications from having to worry about this task.

Thus, applications have evolved to ignore, for the most part, how their files are stored on disk. Nonetheless, there are still some cases where applications need to understand the on-disk file system format. Obviously, the tools used to create a file system or check a file system's consistency need to understand it's format. They are implicitly tied to the file system format, but other, more generic, applications might also need to be able to interpret the file system on-disk data structures.

For example, consider a conventional backup application that relies on the file system driver to interpret the file system format. The backup application searches the file system to copy all files to some backup medium. As each file is read, the file's access time is updated. This interferes with attempts to identify files that haven't been used for long periods of time. An administrator might wish to archive the stale files and remove them from the disk, since they are taking up disk space that might otherwise be available to store files that are accessed more frequently.

The backup application makes this difficult to do. Of course, the backup application could save the access time before reading a file, and then restore the access time after it has finished copying the file to the backup medium. However, what if someone other than the backup application reads the file while it is being backed up? The step of restoring the access time can wipe out the change to the access time that occurred when the file was read by someone else. This can lead to the file being archived prematurely.

A possible solution is to have the backup application read the disk device containing the file system and interpret the file system data structures. This avoids the updated access time, but makes the backup application specific to this file system format. A software vendor wants to write the backup application once and avoid customizing it for each different file system format.

Although others have created self-describing files, no one has attempted to create a self-describing file system. U.S. Pat. No. 5,640,559 describes a way to encode file data and relationships among data in a self-describing format to allow them to be transmitted between computers more efficiently. Another example is the Hierarchical Data Format (HDF) defined by the National Center for Supercomputing Applications (NCSA). See NCSA *HDF5 Reference Manual*, Release 1.2, October 1999. It is a data format specification and a set of libraries used to create self-describing data files. It is commonly used to store scientific data.

Self-describing files have been used in a wide variety of applications including encoding data for communication between computer systems (U.S. Pat. No. 5,257,369), encoding the data in a storage dump (U.S. Pat. No. 5,761,739), a self-describing database management system (U.S. Pat. No. 5,857,195), storing the state of objects in object-oriented systems (U.S. Pat. No. 5,905,987), and encoding file objects in a distributed computing environment (U.S. Pat. No. 5,768,532). Before it was acquired by Microsoft, Entropic, Inc. produced a library that encoded speech files in a self-describing way. Although their documentation referred to the "ESPS File System," theirs was a library that could create a set of files, and was not a general-purpose file system as previously described. For more information see Entropic Research Laboratory, Inc. *ESPS/waves+ with EnSig™ Application Notes*. Chapter entitled "Non-ESPS Programs and the ESPS File System." Release 5.3, 1998. http://www.ling.ed.ac.uk/help/entropic.

U.S. Pat. No. 5,950,203 describes a system with improved access to data stored on a peripheral device. This applies to computer systems that can access the same storage resources on a Storage Area Network (SAN). In the method disclosed, the server is the entity that determines a file's block list. In a self-describing file system, however, the clients can determine the block list themselves.

Overall, the prior art does not appear to suggest or describe a system capable of attaining the same levels of portability and efficiency as the self-describing file system described herein.

SUMMARY OF THE INVENTION

Briefly described, the invention comprises a disk containing a file system and one or more computer systems that can access the disk. Along with the file system, the disk contains a formal description that allows applications to understand the format of the file system.

Instead of relying on a single file system driver to interpret the format of the file system stored on disk, intelligent applications can parse the structure themselves using the formal description to improve performance and add functionality. The added functionality has the advantage of being portable between different file system formats, since applications no longer need to embed knowledge of a specific format.

In a Storage Area Network, multiple computer systems can access the same set of disks. The formal description can provide the basis for accessing remote files more efficiently than existing methods, leading to better overall performance.

These and other features of the invention will be more fully understood by reference to the following drawings.

DETAILED DESCRIPTION OF THE PREFERRED EMBODIMENT

During the course of this description like numbers will be used to identify like elements according to the different views which illustrate the invention.

Figure 1:
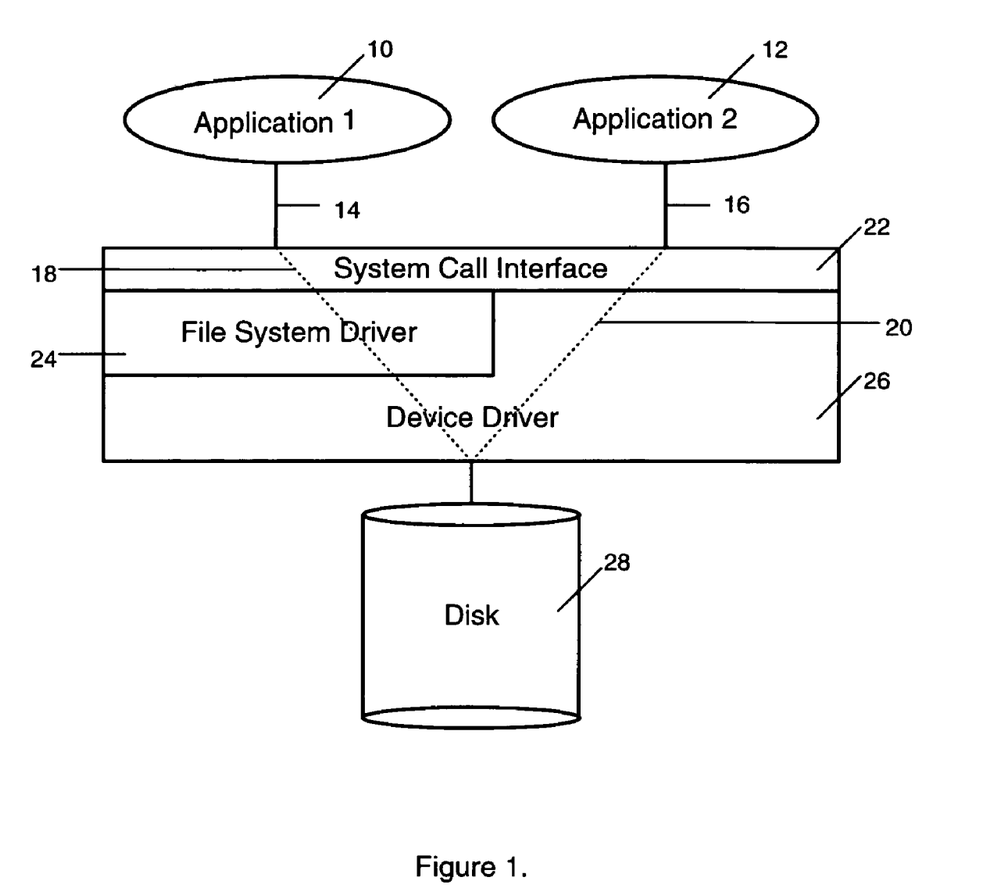
FIG. 1 is a diagram illustrating how application programs gain access to data stored on disk through standard operating system components according to the preferred embodiment of the invention.

The preferred embodiment of the invention is illustrated in FIG. 1. A normal application 10 (one that does not need to interpret the file system format) reads data from and writes data to files in the operating system's file system via path 14–18. This path goes from the application into the operating system traversing the system call interface 22, the file system driver 24, and the device driver 26. The file system driver 24 understands the layout of the file system on disk 28. The disk driver 26 knows how to read and write sectors of the disk 28 and does not interpret the file system layout. With a self-describing file system, however, a more intelligent application 12 can be designed. It reads data from and writes data to files in the operating system's file system via path 16–20. This path goes from the application into the operating system traversing the system call interface 22 and the device driver 26. The description of the file system is stored on disk 28 in a well-known location, such as the last 16 KB of disk 28 containing the file system. The application 12 will read this description and use it to parse the file system data structures.

On disks controlled by the Unix operating system, files are represented by "inodes" (short for "index nodes"). See Bach, Maurice J., *The Design of the Unix Operating System*, Prentice-Hall, Englewood Cliffs, N.J. 1986. Each inode is identified by its "inode number." A formal description needs to convey how inodes are found on disk and how to extract information from the inode. Applications then need to convert the formal description into the appropriate actions to read the inodes.

Three common ways to store inodes on disk are in a table, in a segmented table (i.e., the table is split up into chunks spread out across the file system), or simply segmented (each inode is stored separately, unrelated to the location of other inodes). The inodes themselves can take on any format imaginable. For example, an inode can list the disk blocks constituting the file in a classic direct, single-indirect, double-indirect, triple-indirect layout. Other common ways to list a file's disk blocks include tree structures such as B-trees.

File systems also differ in how they associate disk blocks with files. Simple file systems use a fixed block size. For example, the System V file system has a fixed block size of either 512, 1024, or 2048 bytes. The block size is chosen when the file system is created, and all blocks in the file system are the same size. More complex file systems use variable block sizes. These are called "extents." Extents are contiguous ranges of disk blocks treated as one logical block. With a fixed block size, the inode need only contain the disk block addresses. With extents, the inode also needs to record the size of each extent.

A file's security information is usually stored in the file's inode, but this is not always true. Access Control Lists (ACLs) are sometimes stored separately to facilitate sharing and to provide compatibility with existing file system formats.

File system formats vary widely. This makes it difficult to develop formal descriptions. The description language needs to be flexible and general enough to support all of the different ways file systems represent and store inodes.

One alternative to a formal description is to use the algorithms actually needed to find and interpret the on-disk data structures. Presenting the algorithms to applications requires that the applications be able to execute the algorithms. This implies that the algorithm should be transmitted in some language capable of being interpreted, such as C, basic, or java The drawbacks to using the algorithms are that the applications would need to use an interpreter to implement the algorithm, and there would probably be a performance penalty to using interpreted code instead of compiled code. The advantage, of course, is that an algorithm is the most expedient way to specify the file system format.

Although Storage Area Networks (SANs) provide high-speed access to disk storage, SANs present new problems for client access to structured on-disk data. Instead of relying on a server to read and write data on the disk, clients can directly access the disk themselves. This means that all clients must agree on the same on-disk format. This also means that the clients must use mechanisms to serialize access to the disk.

Figure 2:
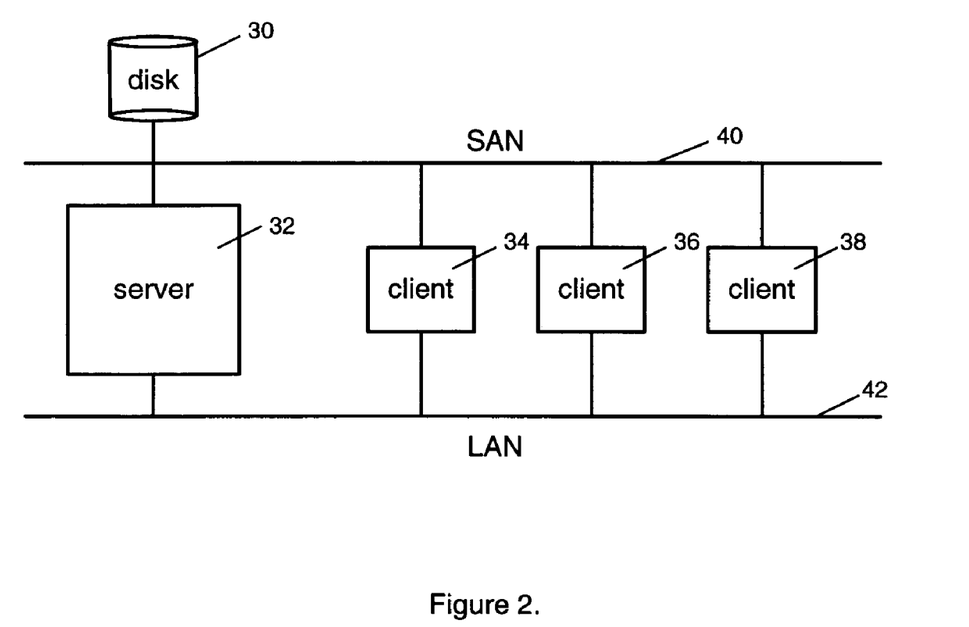
FIG. 2 is a diagram of several client computer systems connected to a server computer system by both a local area network and a storage are network.

FIG. 2 shows three clients 34, 36, and 38 and a server 32 connected via a local area network (LAN) 42. The file systems stored on the disk are shared by the server 32. The disk 30 is accessible to the server 32 and the clients 34, 36, and 38 via the SAN 40. Note that the SAN protocol (FCP) is different than the LAN protocol (TCP/IP).

Network file system protocols, such as NFS and CIFS, allow a server to isolate clients from the server's on-disk file system format, while still allowing the clients to access the file system through the server. This is a network-attached storage (NAS) model. The server acts as a middle-man in this model. To read or write a file, the client asks the server to perform the operation on its behalf. The drawback is reduced performance. Besides the extra delay introduced by the server (copying the data across two different communication pathways), the server becomes a bottleneck in this model when faced with concurrent requests.

Figure 3:
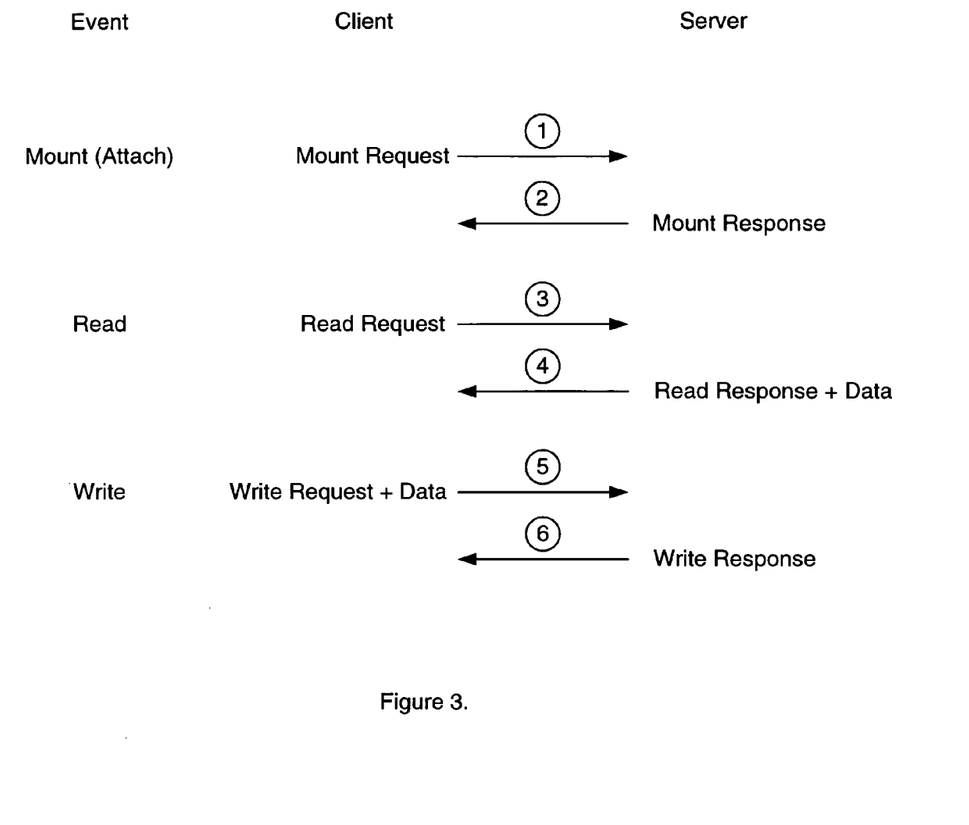
FIG. 3 is a timeline illustrating the sequence of events that occur when accessing a file via a remote file system.

FIG. 3 shows the message exchange in a network file system. A client contacts the server when the network file system is mounted (step 1). The server acknowledges the request in step 2. From that point on, files can be read and written. In step 3, the client sends a read request to the server. The server responds with a message containing the results of the read request, along with any data read (step 4). In step 5, the client sends a message to the server requesting that a file be written. The data to be written to the file are contained in the write request. When the request is complete, the results are sent back to the client in step 6.

Clustered file systems provide an alternate mechanism for client access to on-disk file systems. However, clustered file systems have several drawbacks. They are complex to implement and generally don't work in heterogeneous computing environments.

The Storage Network Industry Association (SNIA) has proposed simple enhancements to conventional remote file system protocols to merge the simplicity and flexibility of the NAS model with the high performance of the SAN model. For more detail see the following publications by CrosStor, Inc. a. CIFS Extensions for SANs, and b. Adapting NAS Protocols to SANs, both White Papers published May 10, 1999. In the proposals, clients request a server to perform all file operations except read and write. To read or write a file, a client will only contact the server to identify the physical blocks on disk to read or write. With the list of physical blocks, a client can then access the disks directly. This proposal has the benefit of removing the need for the clients to understand the file system format. The drawback is that the server can still be a bottleneck when translating an (offset, length) pair in a file to a list of physical block numbers.

Figure 4:
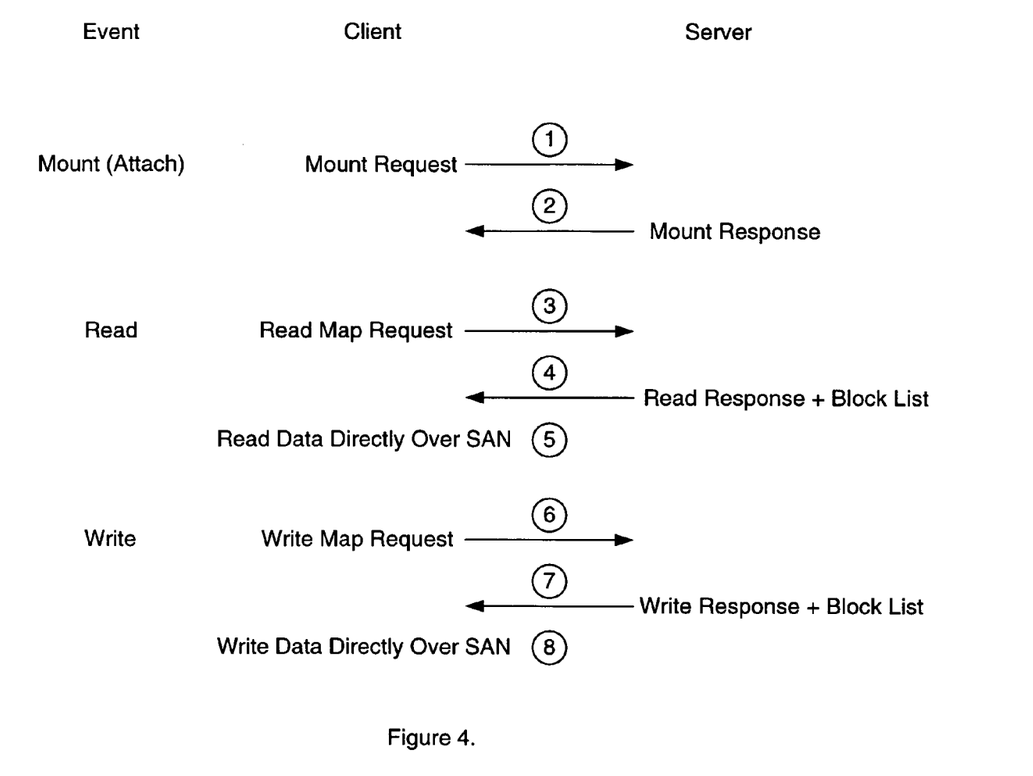
FIG. 4 is a timeline illustrating the sequence of events that occur when accessing a file using the proposed SNIA SAN extensions.

FIG. 4 illustrates the message exchange in the SNIA proposal. Mounts (steps 1 and 2) occur in the same way as in the standard network file system case. The differences show up in the reads and writes. Read requests are replaced by requests to translate the range of the file to be read into a list of physical block numbers (step 3). The server parses the on-disk data structures for the file and returns to the client a list of physical blocks corresponding to the portion of the file to be read (step 4). In step 5, the client uses the list of block numbers to read the data across the SAN, accessing the disk directly. A similar process occurs for writes (steps 6, 7, and 8). Note that the requests and responses exchanged between the client and server go across the LAN. The SAN is only used to access the disk. Newer advances in technology allow both SAN and LAN traffic to use the same physical wire (communication pathway), but this does not affect the operation of the invention.

The SNIA proposal is similar in spirit to the method described in U.S. Pat. No. 5,950,203, although the SNIA proposal is much simpler. The patent disclosure differs in that the disk is used to store the block list for the file being read or written in a different, temporary file. Instead of receiving the block list in a network message, the client reads the list from the temporary file stored on disk.

A self-describing file system can be accessed by clients across a SAN, but in a portable and extensible manner. As in the SNIA proposal, each file system is shared using a NAS protocol. Unlike the SNIA proposal, however, the server does not supply clients with a list of physical block numbers. Instead, when the client attaches to the network file system, the client reads a formal description of the file system from the disk containing the file system, with enough information to allow the client to determine:

1. The physical block and offset containing a file's inode given it's inode number. This is basically the "iread" algorithm typically found in Unix file system drivers.

2. The block list given an offset into the file and a length. This is basically the "bmap" algorithm typically found in Unix file system drivers.

With the formal description, an arbitrary client can determine the blocks to access when reading and writing a file. The server still needs to perform block allocation and file serialization, though. The client need not change when the file system format changes, because the formal description that is stored on disk will change as the file system format changes.

Figure 5:
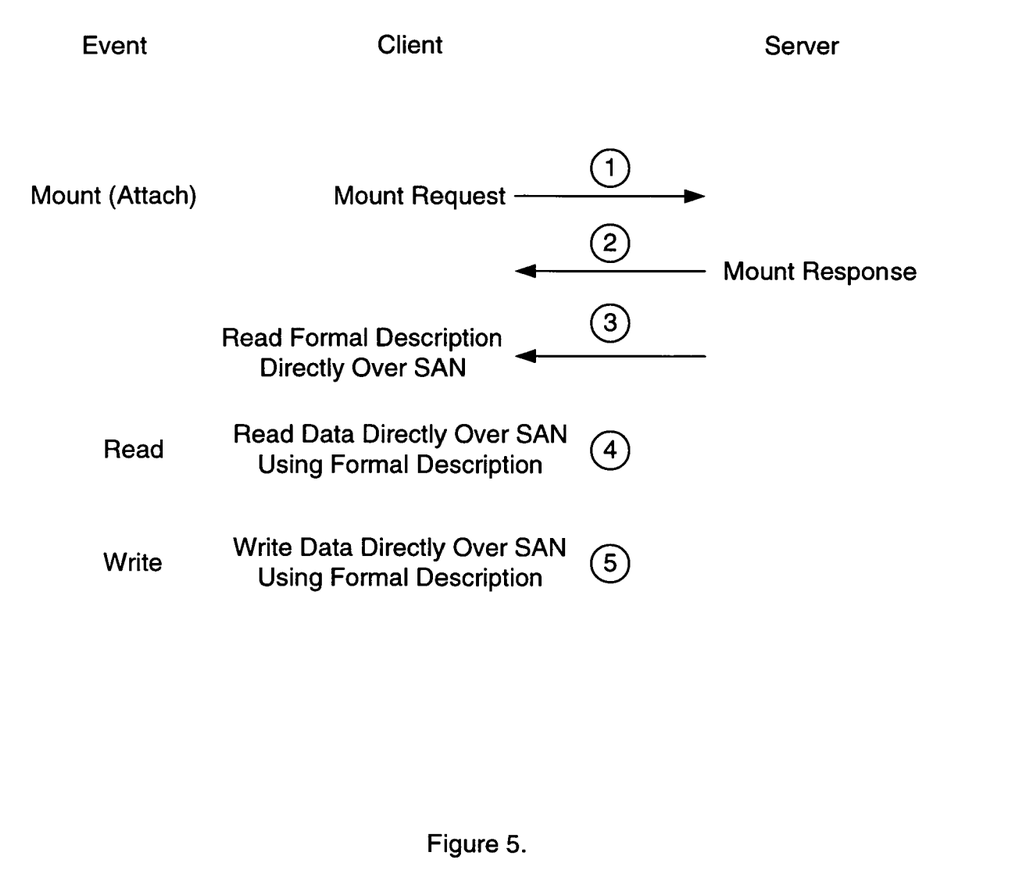
FIG. 5 is a timeline showing the sequence of events that occur when accessing a file stored on a self-describing file system on the SAN.

FIG. 5 shows the message exchange that occurs between a client and server using self-describing file systems. After the mount succeeds (steps 1 and 2), the client reads a formal description of the file system from the disk (step 3). The client saves this description for use in the future. When a read request (step 4) or a write request (step 5) occurs, the client uses the formal description to interpret the file system format and reads or writes the data across the SAN directly.

Figure 6:
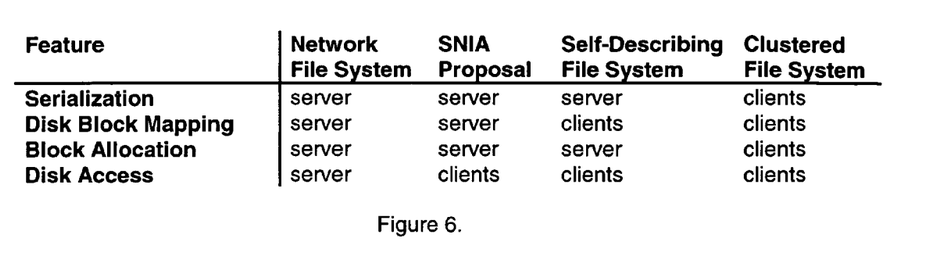
FIG. 6 is a table that compares different file system operations, showing where the responsibility lies for each operation.

FIG. 6 illustrates the differences between the alternate configurations. Each cell of the table identifies who is responsible for the various aspects of file system operation. At one extreme, a network file system places all responsibility with the server. At the other extreme, a clustered file system relies on the clients to do everything for themselves (there really isn't a server per se). Between these two extremes are the current SNIA proposal and the self-describing file system invention described here. Self-describing file systems allow clients to perform the block mapping themselves without requiring the clients to build in knowledge about the file system format.

The System V file system (commonly known as S5) uses a 1 KB block size. More detail about the file system format can be found in Bach, Maurice J., *The Design of the Unix Operating System*, Prentice-Hall, Englewood Cliffs, N.J. 1986 previously discussed. The first block contains optional boot code followed by the super block. The super block contains global information about the file system. After the super block is a contiguous set of blocks containing the array of inodes. The remaining set of blocks are either associated with files or linked on a list of available blocks.

Figure 7:
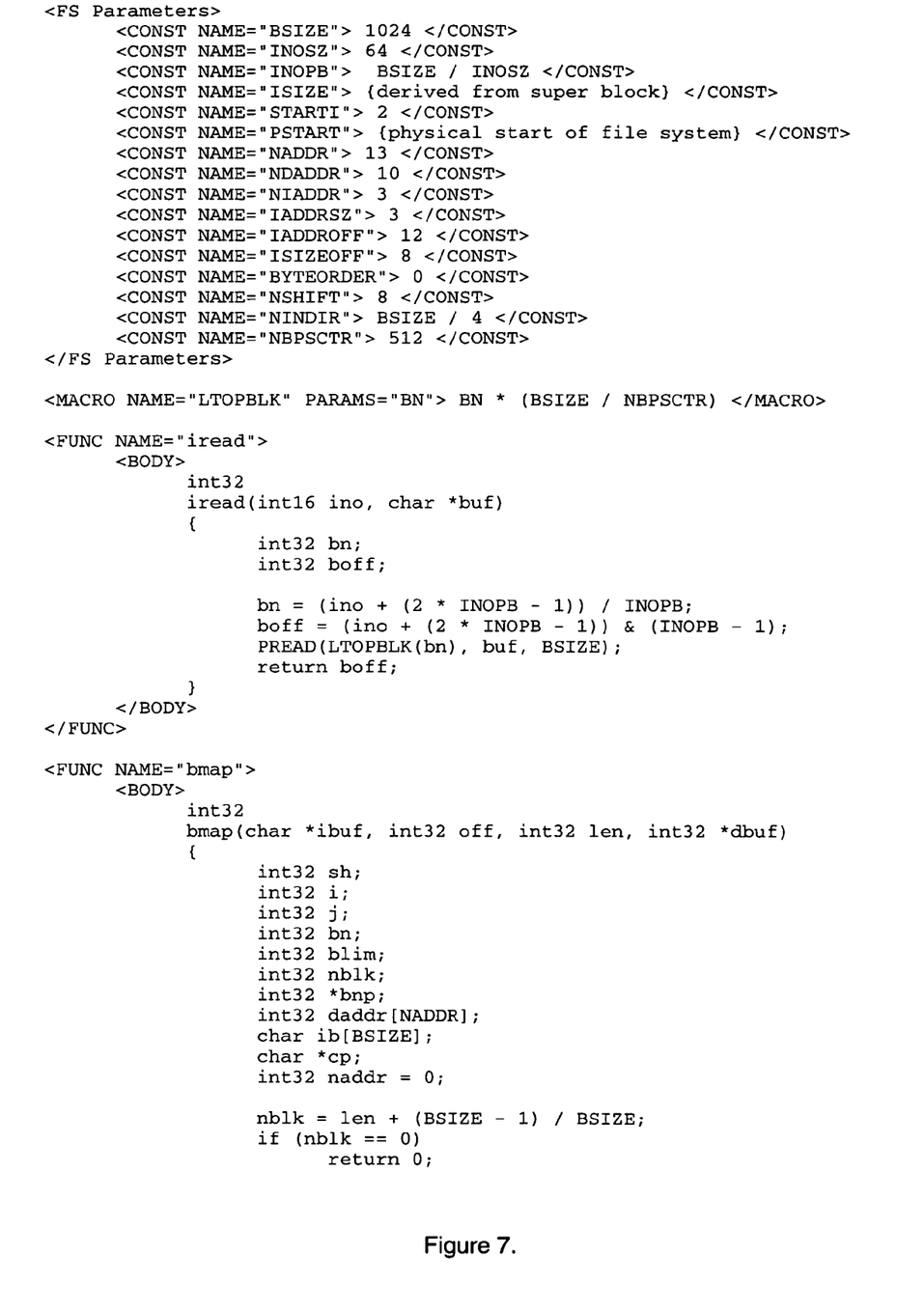
FIG. 7 is the first half of an example of a partial specification of a self-describing file system.
Figure 8:
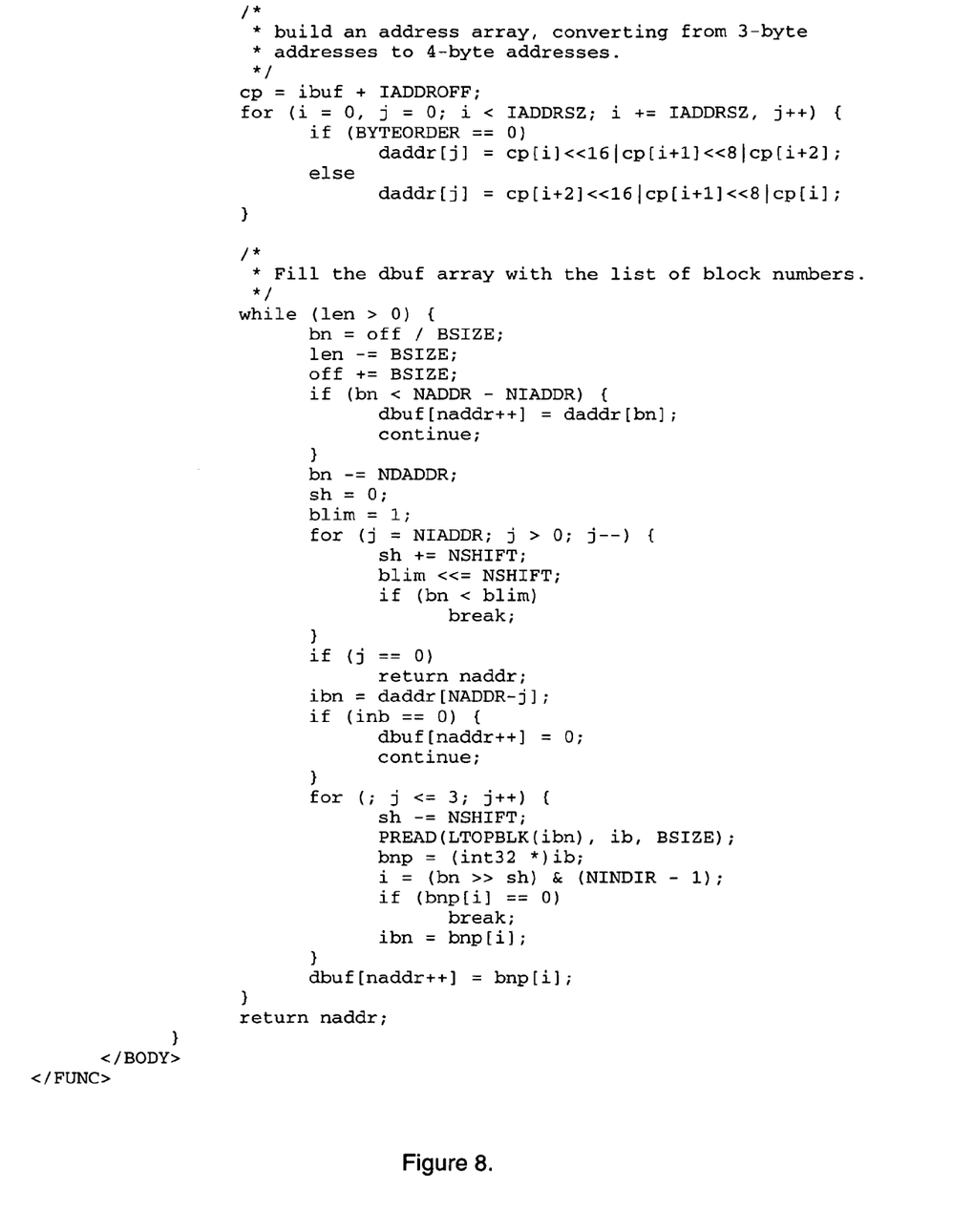
FIG. 8 is the second half of an example of a partial specification of a self-describing file system.

FIGS. 7 and 8 show the C code, specified using XML, needed to find a particular inode in the file system and translate (offset, length) pairs into a list of physical block numbers. This is a portion of a formal description, specified in C, that would be necessary to allow an application to parse the file system format. (The algorithms assume that the applications provide a routine called PREAD to read a disk block. Error cases are ignored for simplicity in the example.)

Simple backup programs read files by going through the file system driver, as discussed in the background. This can cause problems by updating the access time unintentionally. More intelligent backup programs read the disk directly, thereby bypassing the file system driver. These backup programs would have to contain information about which file system formats they support, but with self-describing file systems, these programs can be made portable and can support many different formats just by supporting the ability to interpret the formal description.

Performing "invisible" reads and writes is not the only motivation for reading the disk directly. By bypassing the file system driver, a backup program can improve its performance. Even more performance increases can be realized during incremental backups. Instead of searching the file system, the on-disk inode table can be scanned for candidate files. Scanning a table is considerably faster than searching directories and checking modification times by calling stat (2) on each file.

Another benefit of self-describing file systems is that most file system utility commands can be made independent of the file system type by using the file system's formal description. Unix commands such as df, fstyp, labelit, and ncheck could be written once instead of developing a different version for each supported file system format.

Self-describing file systems allow applications to be developed that can understand multiple file system formats in an extensible and flexible manner. When a file system format evolves, applications do not need to be modified. Instead, only the formal description of the file system needs to be changed. Additionally, a single application can work with different file system formats, because it can adapt dynamically based on the file system's formal description.

While the invention has been described with reference to the preferred embodiment thereof it will be appreciated by those of ordinary skill in the art that modifications can be made to the parts that comprise the invention without departing from the spirit and scope thereof.

I claim:

1. A method for use in a file system including at least one server and one disk storage device for access by at least one client, said method comprising the steps of:
    attaching said client to said file system; and
    reading a formal description of the file system by said client from said disk storage device, wherein the formal description of the file system enables said client to find and interpret at least one data structure that includes file information that enables the client to directly read and write data to and from said disk storage, block allocation for the data being performed by the server, and wherein the formal description of the file system lacks a data structure that includes file information.

2. The method of claim 1, wherein reading a formal description further comprises:
    reading enough information to find and interpret the physical block and offset containing an inode of a given file given the inode number of the inode of the given file.

3. The method of claim 2, wherein reading a formal description further comprises:
    reading enough information to find and interpret the block list of a given file given an offset into the file and a length.

4. The method of claim 3, wherein attaching said client to a file system comprises:
    sending a mount request; and
    receiving a mount response.

5. The method of claim 4, further comprising saving said formal description for future use when an I/O request is made by said client.

6. The method of claim 5, further comprising associating said disk storage device with a Storage Area Network (SAN).

7. The method of claim 5, wherein said client and said server are implemented on the same hardware.

8. The method of claim 1, wherein the formal description of the file system includes an algorithm used to implement the file system.

9. The method of claim 1, wherein the formal description of the file system does not include an algorithm used to implement the file system.

10. A method for reading or writing data from a storage resource, the method comprising:
    acquiring, from the storage resource, a description of a file system associated with the storage resource, wherein the description of the file system enables a client to find and interpret at least one data structure having file information, and wherein the description of the file system lacks a data structure that includes file information; and
    finding and interpreting at least one data structure that includes file information for reading or writing directly to the storage resource based on the file information, block allocation for the data being performed by a server.

11. The method of claim 10, further comprising reading or writing data blocks associated with the file system.

12. The method of claim 10, further comprising:
    on the basis of a file identifier, finding and interpreting a block and an offset, the block and the offset being associated with a file on said file system.

13. The method of claim 12, further comprising:
    on the basis of an offset into a file and a length, finding and interpreting a block list associated with the file.

14. The method of claim 10, wherein the description of the file system includes an algorithm used to implement the file system.

15. The method of claim 10, wherein the description of the file system does not include an algorithm used to implement the file system.

16. An apparatus for reading and writing data from a storage resource, the apparatus being configured to:
    acquire, from the storage resource, a description of a file system associated with a storage resource, wherein the description of the file system enables a client to find and interpret at least one data structure having file information, and wherein the description of the file system lacks a data structure that includes file information; and to
    find and interpret at least one data structure that includes file information for reading or writing directly to the storage resource based on the file information, block allocation for the data being performed by a server.

17. The apparatus of claim 16, further comprising a computer configured to read and write data blocks associated with the file system.

18. The apparatus of claim 16, further comprising a computer configured to read and write files associated with the file system.

19. The apparatus of claim 18, wherein the computer is configured to find and interpret, on the basis of a file identifier, a block and offset associated with a file.

20. The apparatus of claim 18, wherein the computer is configured to find and interpret, on the basis of an offset into the file and a length, a block list associated with a file.

21. The apparatus of claim 16, wherein the description of the file system includes an algorithm used to implement the file system.

22. The apparatus of claim 16, wherein the description of the file system does not include an algorithm used to implement the file system.

23. An article comprising a computer-readable medium that stores computer executable instructions for causing a computer to:

acquire, from a storage resource, a description of a file system associated with a storage resource, wherein the description of the file system enables a client to find and interpret at least one data structure having file information, and wherein the description of the file system lacks a data structure that includes file information; and to find and interpret at least one data structure that includes file information for reading or writing directly to the storage resource based on the file information, block allocation for the data being performed by a server.

24. The article of claim 23, wherein the article includes instructions for causing the computer to write data blocks associated with the file system.

25. The article of claim 23, wherein the article includes instructions for causing the computer to write files associated with the file system.

26. The article of claim 23, wherein the description of the file system includes an algorithm used to implement the file system.

27. The article of claim 23, wherein the description of the file system does not include an algorithm used to implement the file system.

* * * * *